(12) United States Patent
Poon et al.

(10) Patent No.: US 7,375,800 B2
(45) Date of Patent: May 20, 2008

(54) NON-CONTACT PNEUMATIC TRANSFER FOR STAGES WITH SMALL MOTION

(75) Inventors: Alex Ka Tim Poon, San Ramon, CA (US); Leonard Wai-Fung Kho, San Francisco, CA (US)

(73) Assignee: Nikon Corporation (JP)

( * ) Notice: Subject to any disclaimer, the term of this patent is extended or adjusted under 35 U.S.C. 154(b) by 156 days.

(21) Appl. No.: 10/937,172

(22) Filed: Sep. 9, 2004

(65) Prior Publication Data
US 2006/0050262 A1 Mar. 9, 2006

(51) Int. Cl.
*G03B 27/58* (2006.01)
*G03B 27/62* (2006.01)

(52) U.S. Cl. .......................................... 355/72; 355/75

(58) Field of Classification Search .................. 355/53, 355/67, 72, 73, 75, 77; 417/437; 318/592; 250/492.2
See application file for complete search history.

(56) References Cited

U.S. PATENT DOCUMENTS 6,603,130 B1 * 8/2003 Bisschops et al. ....... 250/492.1
2001/0052970 A1 * 12/2001 Sato ............................. 355/72
2005/0024621 A1 * 2/2005 Korenaga ..................... 355/72
2005/0248744 A1 11/2005 Shibazaki

* cited by examiner

*Primary Examiner*—Peter B. Kim
(74) *Attorney, Agent, or Firm*—Technology and Innovation Law Group

(57) ABSTRACT

Methods and apparatus for enabling a fine stage to be moved using pneumatics such that disturbances associated with a pneumatic transfer system are not transmitted to the fine stage are disclosed. According to one aspect of the present invention, a stage apparatus includes a first stage, a second stage, and a pneumatic transfer system. The pneumatic transfer system includes at least one transfer mechanism and a transfer block. The transfer mechanism is substantially directly coupled be coupled between the first stage and the transfer block, and the first stage provides a flow through the transfer mechanism to the transfer block. The transfer block is arranged to be positioned over a surface of the second stage to provide the flow to the second stage substantially without contacting the second stage.

18 Claims, 10 Drawing Sheets

NON-CONTACT PNEUMATIC TRANSFER FOR STAGES WITH SMALL MOTION

BACKGROUND OF THE INVENTION

1. Field of Invention

The present invention relates generally to semiconductor processing equipment. More particularly, the present invention relates to a pneumatic transfer system which enables air and/or vacuum to be transferred between a coarse stage and a fine stage substantially without introducing disturbance forces related to the pneumatic transfer system.

2. Description of the Related Art

For precision instruments such as photolithography machines which are used in semiconductor processing, factors which affect the performance, e.g., accuracy, of the precision instrument generally must be dealt with and, insofar as possible, eliminated. When the performance of a precision instrument is adversely affected, as for example by pitching moments, products formed using the precision instrument may be improperly formed and, hence, function improperly. For instance, a photolithography machine that is subjected to pitching moments may cause an image projected by the photolithography machine to move, and, as a result, be aligned incorrectly on a projection surface such as a semiconductor wafer surface.

Scanning stages such as wafer scanning stages and reticle scanning stages are often used in semiconductor fabrication processes, and may be included in various photolithography and exposure apparatuses. Wafer scanning stages are generally used to position a semiconductor wafer such that portions of the wafer may be exposed as appropriate for masking or etching. Reticle scanning stages are generally used to accurately position a reticle or reticles for exposure over the semiconductor wafer. Patterns are generally resident on a reticle, which effectively serves as a mask or a negative for a wafer. When a reticle is positioned over a wafer as desired, a beam of light or a relatively broad beam of electrons may be collimated through a reduction lens, and provided to the reticle on which a thin metal pattern is placed. Portions of a light beam, for example, may be absorbed by the reticle while other portions pass through the reticle and are focused onto the wafer.

Many scanning stage devices include a coarse stage and a fine stage which cooperate to position an object such as a reticle or a wafer. Specifically, many high precision machines used in semiconductor fabrication use a coarse stage for relatively large motion and a fine stage for smaller, or more precise, motion. A coarse stage is used to coarsely position a reticle or a wafer near a desired position, while a fine stage is used to finely tune the position of the reticle or the wafer once the reticle or the wafer is positioned near its desired position by the coarse stage.

Some stage devices which include a coarse stage and a fine stage use motors to enable the fine stage to move. The use of mechanical bearings often introduces friction into the stage devices. Hence, in lieu of using mechanical bearings, many stage devices use pneumatic bearings. As shown in FIG. 1a, a coarse stage 104 may be directly coupled to a fine stage 108 through a pneumatic coupling 112. Pneumatic coupling 112 typically includes transfer hoses 114, as shown in FIG. 1b, which enables pneumatics, e.g., pressurized air or a vacuum, to be directly transferred from coarse stage 104 to fine stage 108 for a pneumatic bearing.

Pneumatic coupling 112 provides air and vacuum, as appropriate, to an air bearing (not shown) of fine stage 108 which allows fine stage 108 to move, e.g., scan, on an air bearing surface 120 associated with fine stage 108 and surface 124, although pneumatic coupling 112 may also provide air and vacuum transfer to fine stage 108 for other purposes. As will be understood by those skilled in the art, pressurized air may be provided to an air bearing to cause fine stage 108 to be substantially lifted over surface 124, while a vacuum may be provided to the air bearing to effectively preload fine stage 108.

Pneumatic coupling 112 is generally effective in providing air and/or vacuum to fine stage 108 to allow fine stage 108 to make precise motions. However, since pneumatic coupling 112 is directly coupled between coarse stage 104 and fine stage 108, pneumatic coupling 112 often vibrates when fine stage 108 undergoes a positive acceleration or a negative acceleration, i.e., deceleration. The vibrations in pneumatic coupling 112, e.g., the vibrations of transfer tubes 114, are typically due to the mass of transfer tubes 114 and the stiffness of transfer tubes 114. By way of example, a transfer tube 114 generally has a mass that may create a force during acceleration. Such a force may be transmitted to fine stage 108 as a disturbance or, more specifically, a tube disturbance force. As a result, vibrations which are created in pneumatic coupling 112 may cause transmitted disturbances that compromise the operation of fine stage 108 and the accuracy with which fine stage 108 may be positioned, as such disturbances may cause undesirable vibrations in fine stage 108.

Typically, stiffer transfer tubes 114 create higher tube disturbance forces. It should be understood that even in the event that transfer tubes which directly couple coarse stage 104 to fine stage 108 do not create disturbances, the presence of the transfer tubes applies a constant force to fine stage 108, which may also compromise the operation of fine stage 108.

Substantially eliminating tube disturbance forces which are transmitted to a fine stage or, more generally, substantially eliminating unwanted forces which are experienced by a fine stage, during acceleration of the fine stage, as well as acceleration of a coarse stage, may improve the performance of an overall stage system. Therefore, what is needed is a method and an apparatus for reducing the amount of unwanted forces applied on a fine stage by a pneumatic transfer system. In particular, what is desired is a method and an apparatus for allowing pneumatic transfer to occur between a coarse stage and a fine stage substantially without causing forces such as disturbance forces to be transmitted from a pneumatic transfer system to the fine stage.

SUMMARY OF THE INVENTION

The present invention relates to a stage device with a pneumatic transfer system which minimizes or substantially eliminates pneumatic hose disturbances on a fine stage of the stage device. According to one aspect of the present invention, a stage apparatus includes a first stage, a second stage, and a pneumatic transfer system. The pneumatic transfer system includes at least one transfer mechanism and a transfer block. The transfer mechanism is substantially directly coupled between the first stage and the transfer block, and the first stage provides a flow through the transfer mechanism to the transfer block. The transfer block is arranged to be positioned over a surface of the second stage to provide the flow to the second stage substantially without contacting the second stage.

In one embodiment, the transfer block includes a first block opening defined therethrough and a second block opening defined therethrough. The transfer mechanism includes a first transfer mechanism that is in fluid communication with the first block opening and a second transfer mechanism that is in fluid communication with the second block opening. In such an embodiment, the first transfer mechanism provides a first air flow through the first block opening to substantially enable the transfer block to maintain a distance over the second stage.

The use of a transfer block as a part of a pneumatic transfer system that provides pneumatics, e.g., air and/or a vacuum, to a stage which makes small motions enables the transfer of pneumatics to occur substantially without transmitting disturbances associated with the pneumatic transfer system. Since the transfer block effectively floats over or under a surface of the stage, i.e., the fine stage, without coming into physical contact with the stage while the stage is in operation, flow may be transferred between the transfer block or, more generally, the pneumatic transfer system and the stage while disturbances associated with the pneumatic transfer system are effectively isolated from the stage. As a result, the disturbances generally do not cause vibrations in the stage, and the stage may operate with better accuracy.

According to another aspect of the present invention, a stage device includes a coarse stage, a fine stage, and a pneumatic transfer system that is in contact with the coarse stage such that the pneumatic transfer system is substantially directly coupled to the coarse stage. The pneumatic transfer system provides a pneumatic flow from the coarse stage to the fine stage substantially without being in direct contact with the fine stage to enable the fine stage to translate. In one embodiment, the pneumatic flow is arranged to flow between the pneumatic transfer system and the fine stage through a gap defined between the pneumatic transfer system and the fine stage.

According to still another aspect of the present invention, a method for positioning a first stage that is in fluid communication with a second stage through a pneumatic transfer system which has a plurality of hoses that is coupled to the second stage includes providing a first flow to the transfer block through a first hose. The transfer block is preloaded in one embodiment, and the first flow is arranged to enable the transfer block to be positioned at a distance above a surface of the first stage. The method also includes providing a second flow, which allows the first stage to move, to the first stage through a second hose and the transfer block. In one embodiment, providing the first flow to the transfer block through the first host includes providing a positive air pressure to the transfer block.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Tube disturbance forces generally arise from transfer tubes of a pneumatic transfer system which couples a coarse stage to a fine stage. Such tube disturbance forces are transmitted to a fine stage during acceleration of the fine stage, and often compromise the accuracy with which the fine stage may be positioned. Reducing or effectively eliminating tube disturbance forces may improve the performance of an overall stage system that includes a fine stage coupled to transfer tubes by reducing vibrations in the fine stage. Reducing vibrations in a fine stage may enable the fine stage, which has relatively small motions, to more precisely position an object carried on the fine stage.

Typically, transfer tubes of a pneumatic transfer system are directly coupled between a coarse stage and a fine stage such that the pneumatic transfer system is in substantially direct contact with the fine stage during the operation of the fine stage. A pneumatic transfer system which enables a pneumatic transfer of air and vacuum between a coarse stage and a fine stage substantially without coming into direct contact with the fine stage enables the air and the vacuum to be transferred without transmitting disturbances created in the pneumatic transfer system to the fine stage.

In one embodiment, a non-contact pneumatic transfer system includes a transfer bearing that is coupled to a coarse stage through transfer tubes. Air and vacuum may be provided to the transfer bearing from the coarse stage through the transfer tubes. The transfer bearing is arranged to float over a surface of a fine stage such that air and vacuum may be transferred through the transfer bearing to the fine stage substantially without physical contact between the transfer bearing and the fine stage. Due to the fact that the transfer bearing is floating over the surface of the fine stage, as for example on an air cushion or an air bearing surface, there is effectively no transmissibility between the transfer bearing and the fine stage. As such, disturbance forces created in the pneumatic transfer system are generally not transmitted to the fine stage, and the accuracy with which the fine stage is generally not compromised due to the disturbance forces.

Figure 8:
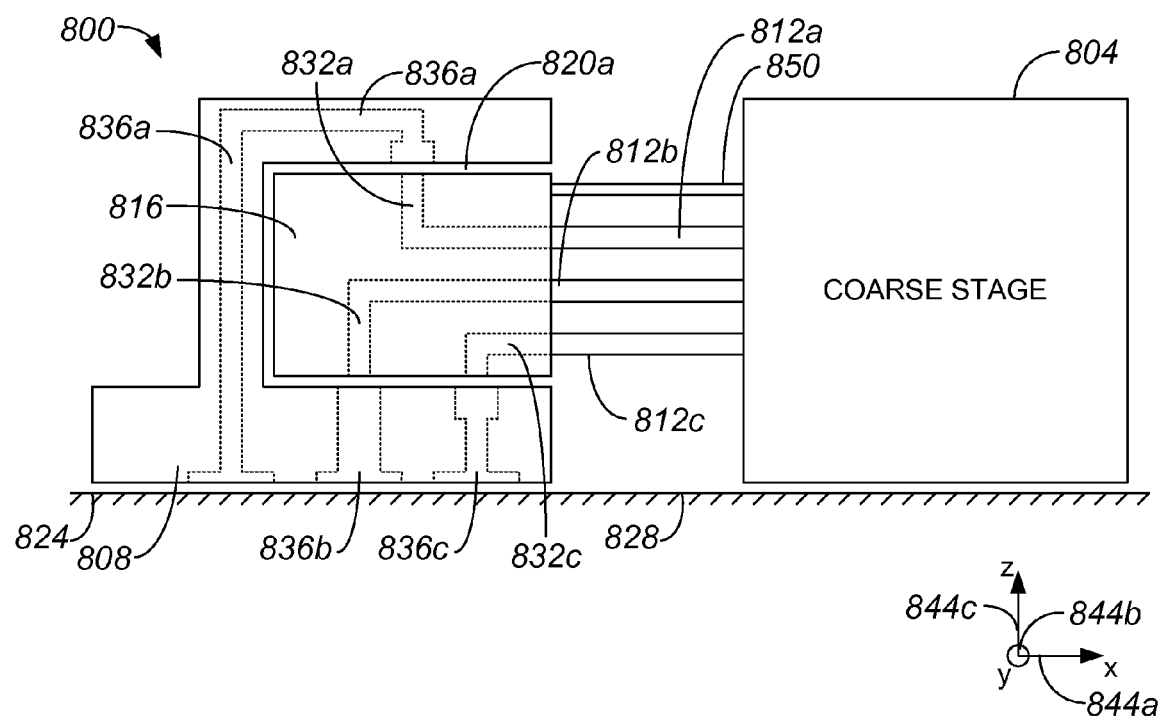
FIG. 8 is a diagrammatic representation of a stage apparatus which includes a coarse stage, a fine stage, and a transfer bearing in accordance with another embodiment of the present invention.

FIG. 8 is a diagrammatic representation of a stage apparatus which includes a coarse stage, a fine stage, and a transfer bearing in accordance with a first embodiment of the present invention. An apparatus 800 includes a coarse stage 804 which is arranged to provide relatively large motion and a fine stage 808 which is arranged to provided relatively small, or precise motion, to a device (not shown) supported on fine stage 808. Typically, the device (not shown) which is supported on fine stage 808 may be a reticle or a wafer.

Transfer tubes 812 or transfer hoses are arranged to perform pneumatic transfer between coarse stage 804 and fine stage 808 in cooperation with a transfer bearing 816 or a transfer block. Although three transfer tubes 812 are shown, it should be appreciated that the number of transfer tubes 812 associated with apparatus 800 may vary widely depending upon the requirements of apparatus 800. Transfer tubes 812 may be substantially directly coupled between coarse stage 804 and transfer bearing 816 such that pressurized air or a vacuum may be applied as appropriate air bearing surfaces 820, which is located between fine stage 808 and transfer bearing 816, and an air bearing associated with fine stage 808 that is interfaced with an air bearing surface 824, which is located between fine stage 808 and a surface 828.

The characteristics, e.g., size or stiffness, of transfer tubes 812 may vary depending upon the air pressure of air that is being transferred through transfer tubes 812. In addition, the materials from which transfer tubes 812 are formed may vary. A variety of different materials may be used to form transfer tubes 812. Suitable materials may include, but are not limited to, rubber and polyurethane.

In general, transfer bearing 816 may be of a size, e.g., have a footprint or a mass, that is substantially smaller than the size of fine stage 808. As a result, the mass of transfer bearing 816 may generally not significantly affect the lateral movement of fine stage 808. Further, transfer bearing 816 may be formed or machined from substantially any suitable material including, but not limited to, a metal or a ceramic.

Transfer tubes 812a, 812c are typically arranged to provide pressurized air through openings 832a, 832c, respectively, in transfer bearing 816 to enable transfer bearing 816 to be held over a surface of fine stage 808 and under another surface of fine stage 808 to provide air isolation of transfer bearing 816 relative to fine stage 808. Air that is provided from coarse stage 804 through transfer tubes 812a, 812c and openings 832a, 832c, respectively, allows transfer bearing 816 to be pneumatically isolated from fine stage 808, particularly in a lateral direction. The pressure of air flowing through transfer tubes 812a, 812c may be individually tuned to achieve a substantially optimal air gap between transfer bearing 816 and fine stage 808 for both pneumatic isolation and pneumatic transfer. It should be appreciated that air bearing surfaces 820 enables fine stage 808 to move laterally with respect to transfer bearing 816.

Since transfer bearing 816 is essentially floating between surfaces of fine stage 808 and fine stage 808 is not directly coupled to transfer tubes 812, there is effectively no transmissibility between fine stage 808 and transfer bearing 816 in the planes of air bearing surfaces 820, i.e., in planes defined by x-axis 844a and y-axis 844b. As a result, there is substantially no force transmitted from transfer bearing 816 to the planes of air bearing surfaces 820 even when fine stage 808 or coarse stage 804 are accelerating. Therefore, disturbances on fine stage 808 due to a pneumatic transfer system, which may include transfer tubes 812 and transfer bearing 816, used to provide fine stage 808 with air pressure or a vacuum from coarse stage 804 may be minimized.

Transfer tubes 812a-c may generally be arranged to provide either pressurized air or a vacuum from coarse stage 804 through openings 832a-c, respectively, in transfer bearing 816 to openings 836 in fine stage 808 such that fine stage 808 may move laterally on air bearing surface 824. It should be appreciated that since there may be some leakage of pressurized air or a vacuum through the gap between transfer bearing 816 and fine stage 808, the air pressure and the vacuum may be adjusted such that even with leakage, the amount of air pressure or vacuum received by fine stage 808 is a desired amount. For example, an air pressure supplied by coarse stage 804 through a transfer tube 812 may be greater than an air pressure that is actually needed by fine stage 808 in order to accommodate pressure losses through the gap between transfer bearing 816 and fine stage 808.

Transfer tube 812c may provide either a positive air pressure or a vacuum, i.e., a negative air pressure, depending upon the requirements of apparatus 800 or, more specifically, the design of an air bearing which is interfaced with air bearing surface 824. In general, the size of a gap between surface 828 and fine stage 808 is greater than each gap between transfer bearing 816 and fine stage 808.

As fine stage 808 translates laterally, e.g., either along an x-axis 844a or a y-axis 844b, openings 832a-c are arranged to be aligned with openings 836a-c, respectively, such that air at a positive pressure and/or a vacuum may be transferred through transfer bearing 816 to fine stage 808 as appropriate. In the described embodiment, openings 836 have a larger diameter than openings 832, although it should be appreciated that openings 836 may instead have approximately the same diameter as openings 832, depending upon the range of relative motion between transfer block 816 and fine stage 808.

In order to substantially maintain constant air bearing gaps between transfer bearing 816 and fine stage 808, a flexure 850, e.g., a Z flexure, may be used to substantially connect coarse stage 804 and transfer bearing 816 so that relative movement between coarse stage 804 and fine stage 808 in z-direction 844c will have little or no effect on the air bearing gaps between transfer bearing 816 and fine stage 808.

Figure 1A:
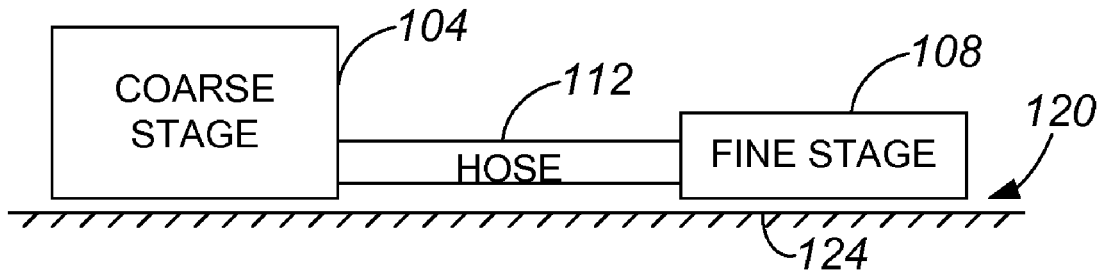
FIG. 1a is a diagrammatic representation of a coarse stage and a fine stage which are coupled by a pneumatic transfer system.
Figure 1B:
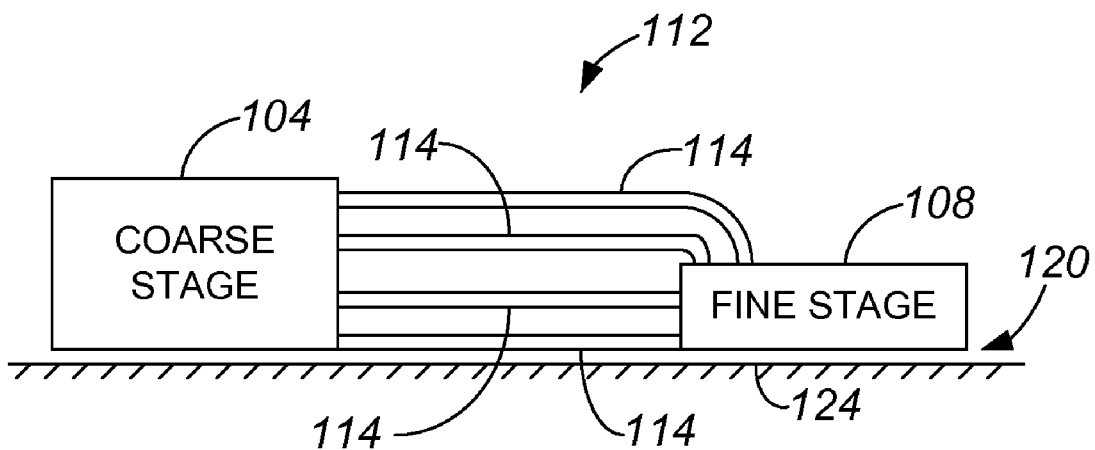
FIG. 1b is a diagrammatic representation of a coarse stage and a fine stage, i.e., coarse stage 104 and fine stage 108 of FIG. 1a, which are coupled by pneumatic transfer tubes.
Figure 2:
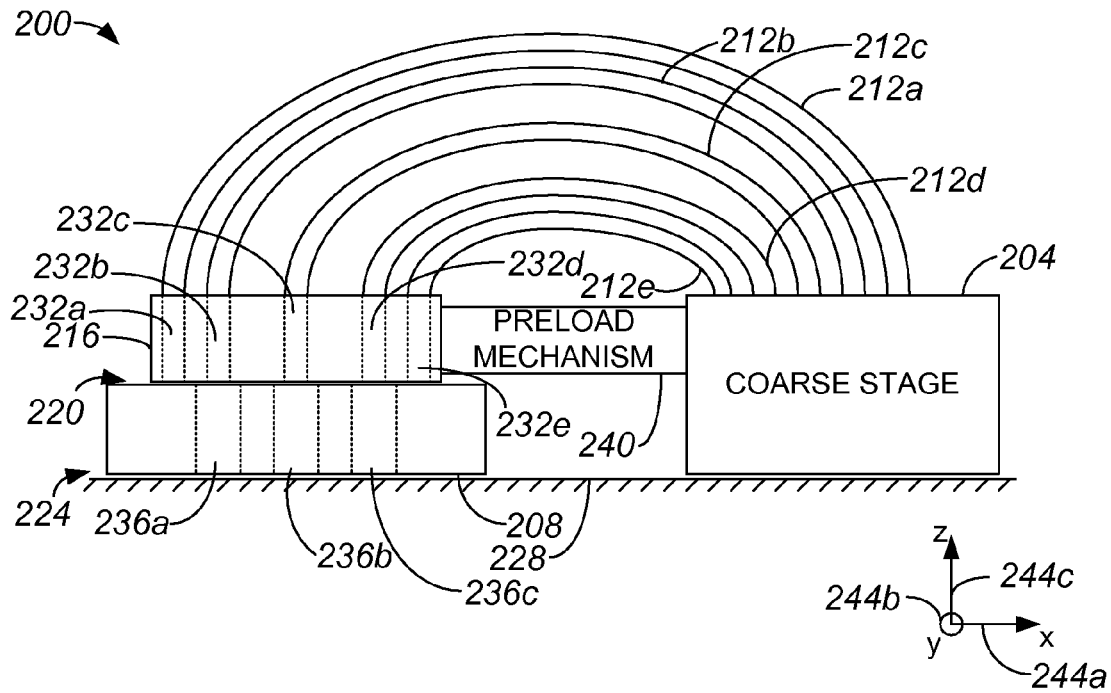
FIG. 2 is a diagrammatic representation of a stage apparatus which includes a coarse stage, a fine stage, and a transfer bearing with air transfer openings that have smaller diameters than openings in the fine stage in accordance with an embodiment of the present invention.

FIG. 2 is a diagrammatic representation of a stage apparatus which includes a coarse stage, a fine stage, and a transfer bearing in accordance with another embodiment of the present invention. An apparatus 200 includes a coarse stage 204 and a fine stage 208. Transfer tubes 212 or transfer hoses are arranged to perform pneumatic transfer between coarse stage 204 and fine stage 208 in cooperation with a transfer bearing 216 or a transfer block. Although five transfer tubes 212 are shown, it should be appreciated that the number of transfer tubes 212 associated with apparatus 200 may vary widely depending upon the requirements of apparatus 200. Transfer tubes 212 may be substantially directly coupled between coarse stage 204 and transfer bearing 216 such that pressurized air or a vacuum may be applied as appropriate to air bearing surface 220, which is located between fine stage 208 and transfer bearing 216, and an air bearing associated with fine stage 208 that is interfaced with an air bearing surface 224, which is located between fine stage 208 and a surface 228.

Transfer tubes 212a, 212e are typically arranged to provide pressurized air through openings 232a, 232e, respectively, in transfer bearing 216 to enable transfer bearing 216 to be held over fine stage 208 to provide air isolation of transfer bearing 216 relative to fine stage 208. Air that is provided from coarse stage 204 through transfer tubes 212a, 212e and openings 232a, 232e, allows a relatively small gap, e.g., less than approximately two to three microns, to be maintained between transfer bearing 216 and fine stage 208 such that disturbances caused by the motion of transfer bearing 216, particularly lateral motion, may effectively be minimized. It should be appreciated that air bearing surface 220 enables fine stage 208 to move laterally with respect to transfer bearing 216.

Since transfer bearing 216 is essentially floating over fine stage 208 and fine stage 208 is not directly coupled to transfer tubes 212, there is effectively no transmissibility between fine stage 208 and transfer bearing 216 in the plane of air bearing surface 220, i.e., in a plane defined by x-axis 244a and y-axis 244b. As a result, there is substantially no force transmitted from transfer bearing 216 to the plane of air bearing surface 220 even when fine stage 208 or coarse stage 204 are accelerating. Therefore, disturbances on fine stage 208 due to a pneumatic transfer system, which may include transfer tubes 212 and transfer bearing 216, used to provide fine stage 208 with air pressure or a vacuum from coarse stage 204 may be minimized.

Transfer tubes 212b-d may generally be arranged to provide either pressurized air or a vacuum from coarse stage 204 through openings 232b-d, respectively, in transfer bearing 216 to openings 236 in fine stage 208 such that fine stage 208 may move laterally on air bearing surface 224. It should be appreciated that since there may be some leakage of pressurized air or a vacuum through the gap between transfer bearing 216 and fine stage 208, the air pressure and the vacuum may be adjusted such that even with leakage, the amount of air pressure or vacuum received by fine stage 208 is a desired amount. For example, an air pressure supplied by coarse stage 204 through a transfer tube 212 may be greater than an air pressure that is actually needed by fine stage 208 in order to accommodate pressure losses through the gap between transfer bearing 216 and fine stage 208.

Each transfer tube 212b-d may provide either a positive air pressure or a vacuum, i.e., a negative air pressure, depending upon the requirements of apparatus 200 or, more specifically, the design of an air bearing which is interfaced with air bearing surface 224. In general, the size of a gap between surface 228 and fine stage 208 is greater than the gap between transfer bearing 216 and fine stage 208.

As fine stage 208 translates laterally, e.g., either along an x-axis 244a or a y-axis 244b, openings 232b-d are arranged to be aligned with openings 236a-c, respectively, such that air at a positive pressure and/or a vacuum may be transferred through transfer bearing 216 to fine stage 208 as appropriate. In the described embodiment, openings 236 have a larger diameter than openings 232b-d, although it should be appreciated that openings 236 may instead have approximately the same diameter as openings 232b-d, as will be discussed below with reference to FIG. 4. The alignment of openings 232b-d with respect to openings 236a-c, respectively, will be discussed below with respect to FIGS. 3a and 3b.

In order to substantially prevent transfer bearing 216 from significantly moving along a z-axis 244c, a preload mechanism 240 which is coupled between coarse stage 204 and transfer bearing 216 may be used to maintain a desired gap between transfer bearing 216 and fine stage 208. The gap between transfer bearing 216 and fine stage 208 and, hence air bearing surface 220, as previously mentioned, enables transfer bearing 216 to be substantially isolated from fine stage 208. Generally, the configuration of preload mechanism 240 may vary widely. By way of example, preload mechanism 240 may include springs which are used to preload transfer bearing 216 such that an amount of preload is substantially uniform across air bearing surface 220. A stiff spring coupled to coarse stage 204 may also be coupled to a self-centering device, e.g., a spherical body, that is in contact with the top surface of transfer bearing 216. By adjusting the amount of force on the self-centering device, and by changing the pressure or vacuum provided through openings 232a and 232e, the gap between transfer bearing 216 and fine stage 208 may be maintained at substantially a desired distance.

Figure 3A:
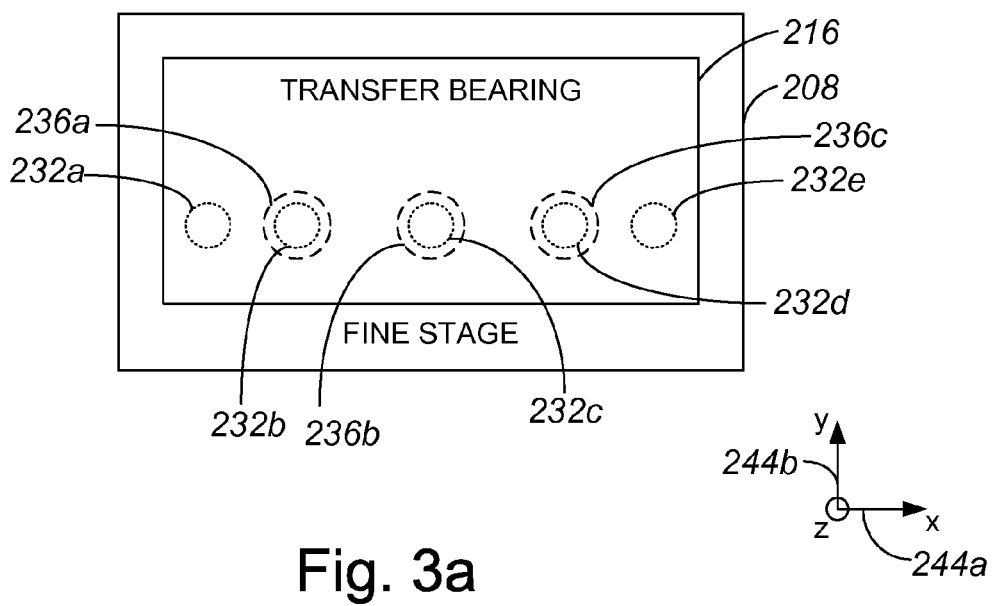
FIG. 3a is a diagrammatic representation of a transfer bearing and a fine stage, i.e., transfer bearing 216 and fine stage 208 of FIG. 2, which are aligned in a first position in accordance with an embodiment of the present invention.
Figure 3B:
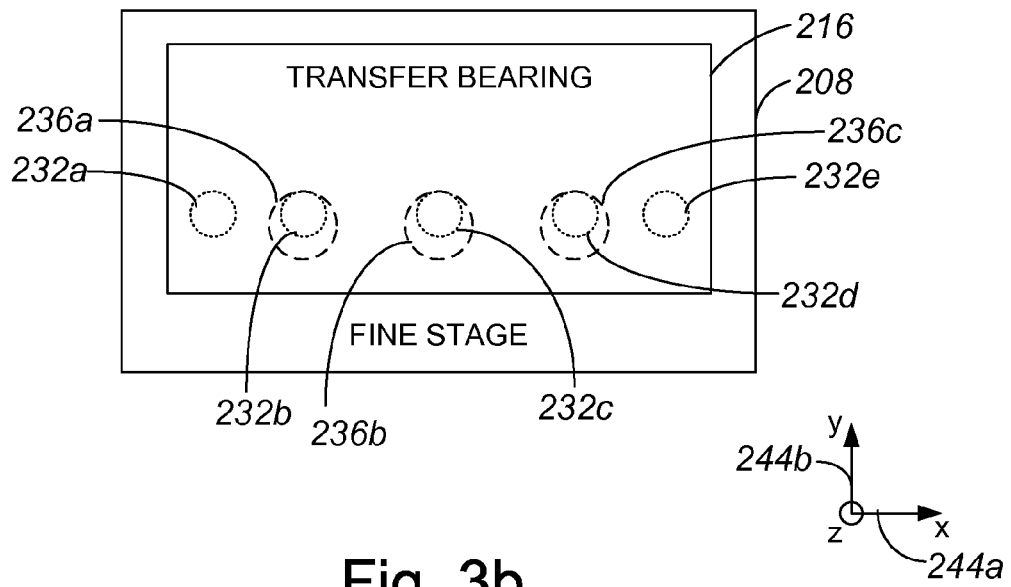
FIG. 3b is a diagrammatic representation of a transfer bearing and a fine stage, i.e., transfer bearing 216 and fine stage 208 of FIG. 2, which are aligned in a second position in accordance with an embodiment of the present invention.

With reference to FIG. 3a, the orientation of openings 232b-d in transfer bearing 216 relative to openings 236 in fine stage 208 will be described in accordance with an embodiment of the present invention. Openings 232b-d in transfer bearing 216 are arranged to interface with openings 236 in fine stage 208 such that pneumatic transfer may occur between transfer tubes 212b-d, as shown in FIG. 2, and fine stage 208 through transfer bearing 216. As indicated, openings 232b-d may each have a diameter that is smaller than a diameter of openings 236a-c, respectively. When openings 232b-d are in a first position relative to openings 236a-c, respectively, substantially the entire outline or circumference of openings 232b-d is within the outline of openings 236a-c, respectively. Hence, pneumatic transfer may occur in a relatively unobstructed manner. When openings 232b-d are in a second position relative to openings 236a-c, respectively, as shown in FIG. 3b, openings 236a-c still overlap openings 232b-d, respectively, such that pneumatic transfer may be relatively unimpeded. As long as openings 236a-c overlap openings 232b-d, respectively, when there is motion of fine stage 208 relative to transfer bearing 216, air and vacuum transfer between fine stage 208 and transfer bearing 216 may occur.

Figure 3C:
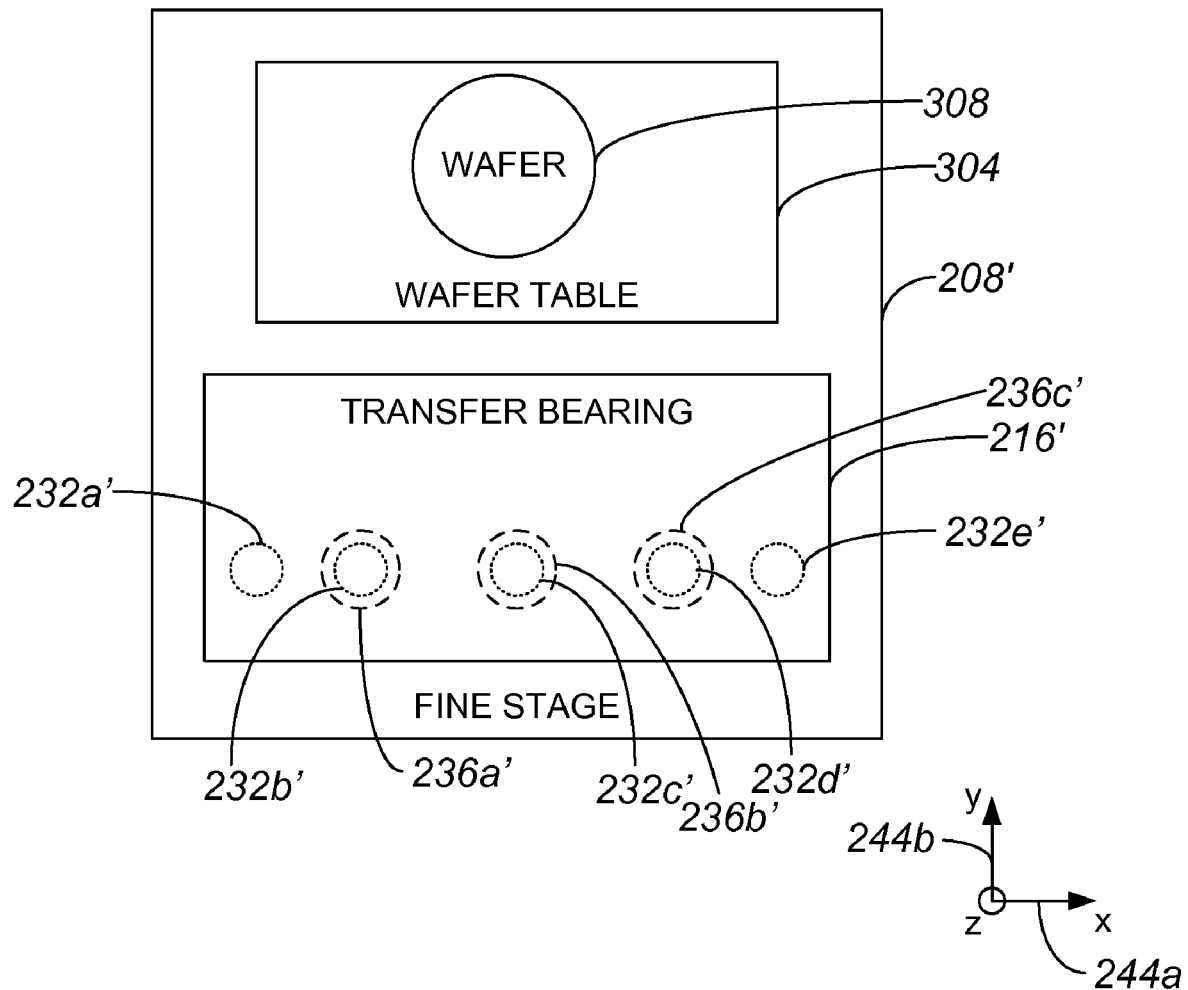
FIG. 3c is a diagrammatic representation of a transfer bearing and a fine stage which supports a wafer in accordance with an embodiment of the present invention.

Transfer bearing 216 is shown as being positioned over fine stage 208. It should be appreciated that in addition to transfer bearing 216, a wafer table and a wafer, or a reticle table and a reticle, may generally also be positioned over fine stage 208. More specifically, fine stage 208 is typically arranged to carry an object that is to be scanned, such as a reticle or a wafer. Hence, when pneumatic transfer occurs between openings 232b-d and openings 236a-c, respectively, fine stage 208 may make precise movements along either x-axis 244a or y-axis 244b to position the object carried on fine stage 208 appropriately. FIG. 3c is a diagrammatic representation of a fine stage, e.g., fine stage 208 of FIG. 2, which carries a wafer in accordance with an embodiment of the present invention. A fine stage 208' is positioned such that a transfer bearing 216' is effectively floating over fine stage 208'. Fine stage 208' may support a wafer table 304, e.g., a wafer chuck, which is arranged to support a wafer 308. Pneumatic flow through openings 232' in transfer bearing 216' and openings 236 in fine stage 208' allows fine stage 208' to translate such that wafer 308 may be positioned in a desired location, e.g., a particular location relative to a reticle (not shown). In one embodiment, a vacuum transferred to fine stage 208' through transfer bearing 216' may be provided to a wafer chuck (not shown) which is arranged to hold wafer 308 in place.

In general, as long as air flow openings of a transfer bearing, e.g., openings 232b-d of FIG. 2, are substantially always encompassed, or overlapped, by air flow openings of a fine stage, e.g., openings 236a-c, to allow pneumatic transfer through openings 232b-d to openings 236a-c, respectively, the diameter of openings 232b-d and openings 236a-c may be substantially any size. For example, as previously mentioned, openings of a transfer bearing may have diameters that are approximately the same size as diameters of openings of a fine stage as long as at least parts of the openings of the transfer bearings substantially always overlap the openings of the fine stage when the fine stage is in use.

Figure 4:
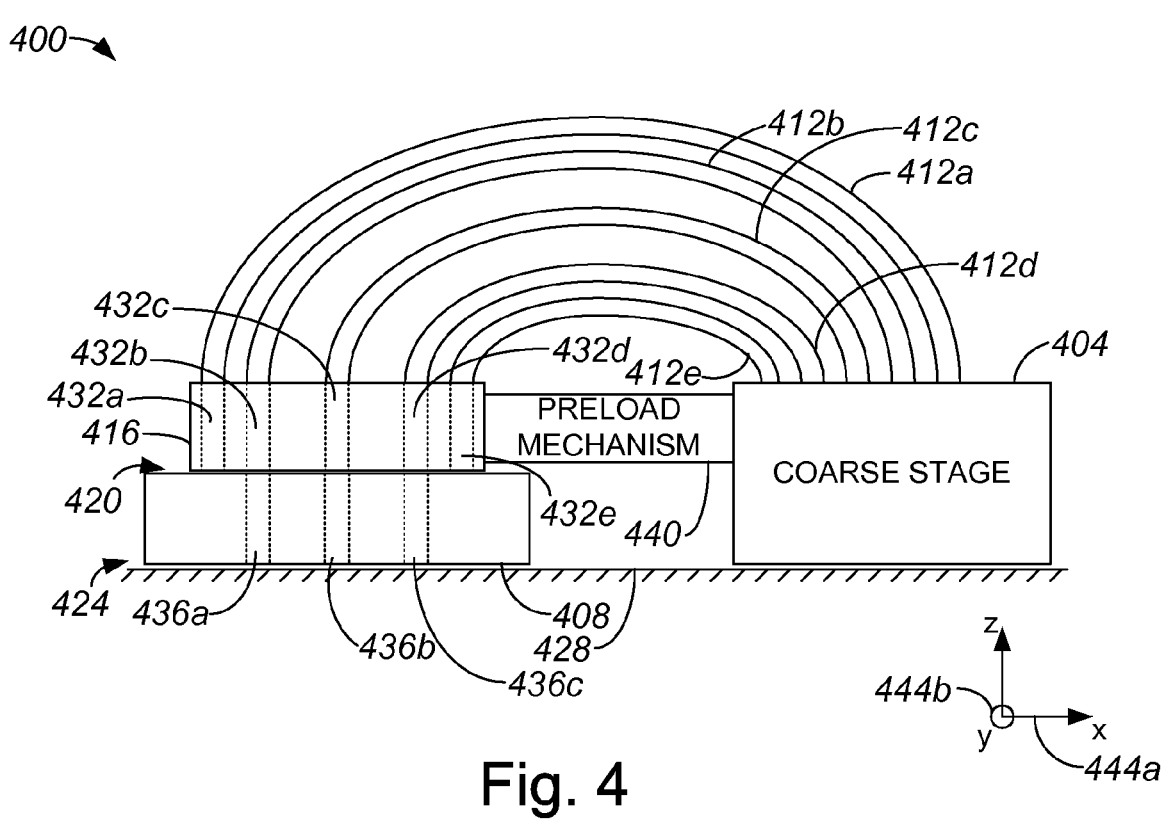
FIG. 4 is a diagrammatic representation of a stage apparatus which includes a coarse stage, a fine stage, and a transfer bearing with air transfer openings that have substantially the same diameter as openings in the fine stage in accordance with an embodiment of the present invention.

FIG. 4 is a diagrammatic representation of a stage apparatus which includes a coarse stage, a fine stage, and a transfer bearing with air transfer openings that have substantially the same diameter as openings in the fine stage in accordance with an embodiment of the present invention. An apparatus 400 includes a coarse stage 404 and a fine stage 408. Transfer tubes 412 or transfer hoses allow for pneumatic transfer between coarse stage 404 and fine stage 408 through a transfer bearing 416 or a transfer block. A preload is applied to transfer bearing 416 by a preload mechanism 440.

Transfer tubes 412a, 412e are arranged to provide pressurized air through openings 432a, 432e, respectively, in transfer bearing 416 to enable transfer bearing 416 to effectively float over fine stage 408 to provide air isolation of transfer bearing 416 relative to fine stage 404. Air that is provided from coarse stage 404 through transfer tubes 412a, 412e and openings 432a, 432e, allows a relatively small gap to be maintained between transfer bearing 416 and fine stage 408. Air bearing surface 420 enables fine stage 408 to move laterally with respect to transfer bearing 416, while an air bearing surface 424 enables fine stage 408 to move laterally with respect to a surface 428.

Transfer tubes 412b-d may generally be arranged to provide either pressurized air or a vacuum from coarse stage 404 through openings 432b-d, respectively, in transfer bearing 416 to openings 436 in fine stage 408. When fine stage 408 translates laterally, e.g., either along an x-axis 444a or a y-axis 444b, openings 432b-d are arranged to be in fluid communication with openings 436a-c, respectively, such that air at a positive pressure and/or a vacuum may be transferred through transfer bearing 416 to fine stage 408 as appropriate. Openings 436 and openings 432b-d have substantially the same diameter. As such, in order for openings 432b-d and openings 436a-c, respectively, to be in fluid communication, e.g., in order for opening 432b to be in fluid communication with opening 436a, at least a part of openings 432b-d and openings 436a-c, respectively, are generally coincident, or overlapping, while fine stage 408 is in operation.

Figure 5A:
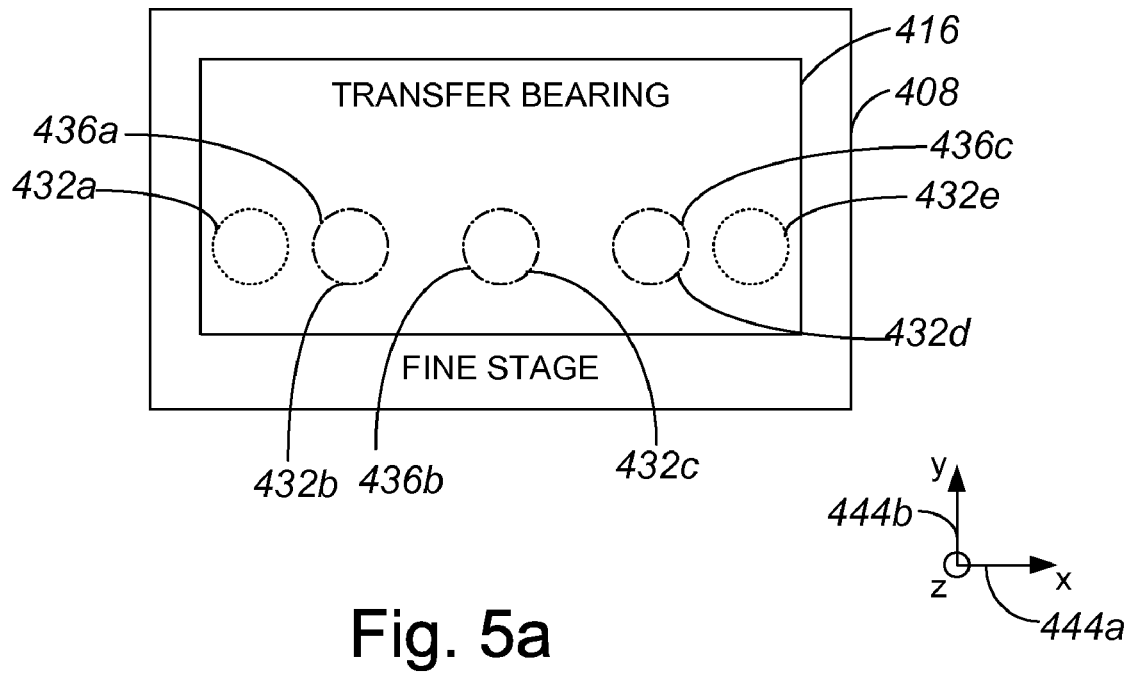
FIG. 5a is a diagrammatic representation of a transfer bearing and a fine stage, i.e., transfer bearing 416 and fine stage 408 of FIG. 4, which are aligned in a first position in accordance with an embodiment of the present invention.
Figure 5B:
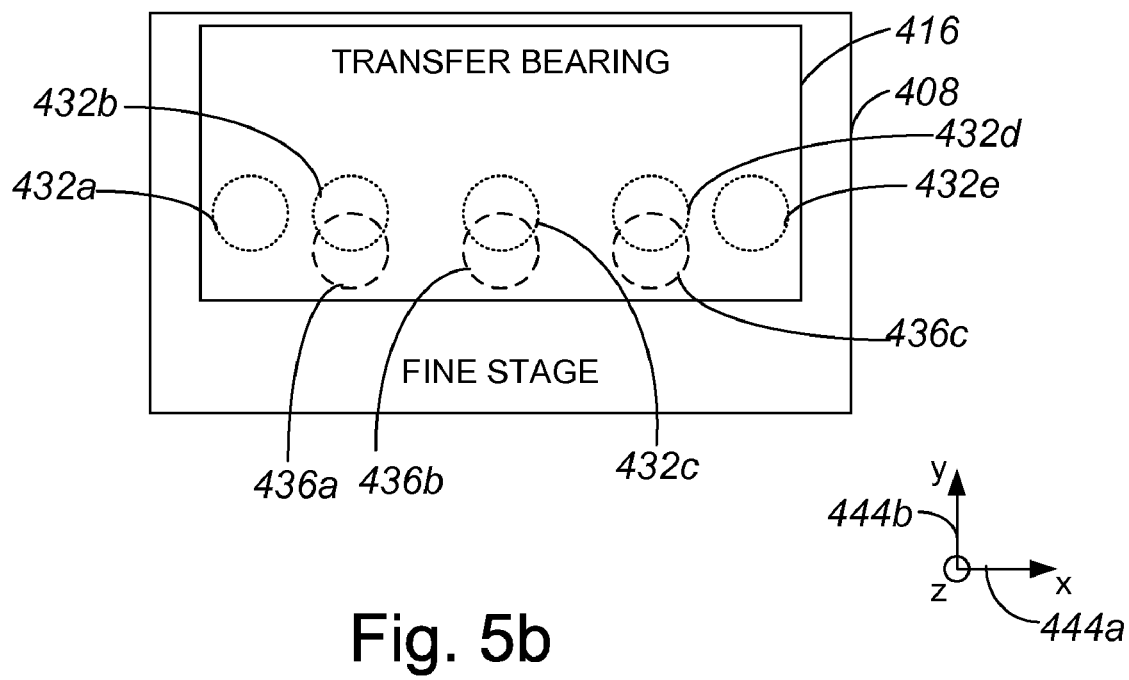
FIG. 5b is a diagrammatic representation of a transfer bearing and a fine stage, i.e., transfer bearing 416 and fine stage 408 of FIG. 4, which are aligned in a second position in accordance with an embodiment of the present invention.

As shown in FIG. 5a, when openings 432b-d and openings 436a-c, respectively, are substantially exactly aligned, the outlines of openings 432b-d effectively coincide with the outlines of openings 436a-c, respectively. Hence, air or a vacuum may be transferred between openings 432b-d and openings 436a-c, respectively, which are in fluid communication. Even when outlines of openings 432b-d are not substantially aligned with outlines of openings 436a-c, respectively, fluid communication may still occur. Referring next to FIG. 5b, which is a diagrammatic representation of fine stage 408 and transfer bearing 416 when openings 432b-d are not substantially exactly aligned with openings 436a-c, respectively, when at least portions of openings 432b-d and openings 436a-c, respectively, are overlapping, then fluid communication may still occur between transfer bearing 416 and fine stage 408. In other words, as long as air or a vacuum may flow through openings 432b-d into corresponding openings 436a-c, then openings 432b-d and corresponding openings 436a-c may be aligned in substantially any manner.

Figure 6:
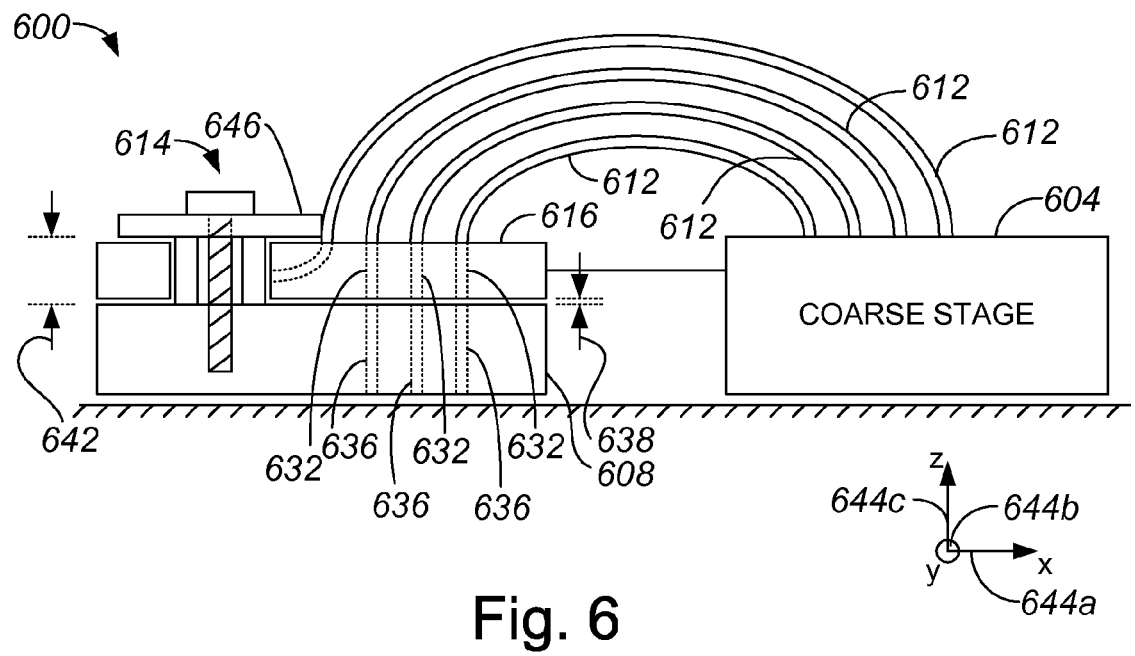
FIG. 6 is a diagrammatic representation of a stage apparatus which includes a fine stage that is configured to preload a transfer bearing in accordance with an embodiment of the present invention.

A mechanism used to provide a preload to a transfer bearing may take on a variety of different configurations. Typically, the amount of preload or preload force applied to a transfer bearing to enable a gap between the transfer bearing and a fine stage may vary depending upon the configuration of the overall system. In one embodiment, a preload mechanism may be coupled to a fine stage such that motion of a transfer bearing is at least partially constrained along a z-axis. FIG. 6 is a diagrammatic representation of a stage apparatus which includes a fine stage that is configured to preload a transfer bearing in accordance with an embodiment of the present invention. A stage apparatus 600 includes a coarse stage 604, a fine stage 608, and a transfer bearing 616. Transfer tubes 612, which are substantially directly coupled between coarse stage 604 and transfer bearing 616, allow air and/or vacuum to be transferred from coarse stage 604 through transfer tubes 612 into openings 632 in transfer bearing 616 to openings 636 in fine stage 608.

Fine stage 608 and transfer bearing 616 are not directly coupled, and transfer bearing 616 is arranged to float over fine stage 608. It should be appreciated that since fine stage 608 and transfer bearing 616 are not directly coupled, fine stage 608 is also not directly coupled to transfer tubes 612. To enable transfer bearing 616 to float over fine stage 608 or, more specifically, to enable a desired gap 638 to be substantially maintained between transfer bearing 616 and fine stage 608, a preload is applied such that movement of transfer bearing 616 along a z-axis 644c is relatively constrained, while lateral movement of transfer bearing 616 along an x-axis 644a and a y-axis 644b generally remains unaffected by the preload.

A preload device 614, which may be considered to be part of fine stage 608, is positioned on a portion of fine stage 608 and arranged to provide a preload force on transfer bearing 616 along z-axis 644c. Preload device 614 cooperates with fine stage 608 to effectively set gap 638. The size of gap 638, i.e., the height of gap 638 along z-axis 644c, may be varied by altering the amount of preload force applied by preload device 614, or by altering a gap distance 642 between fine stage 608 and a first part 646 of preload device 614.

Figure 7:
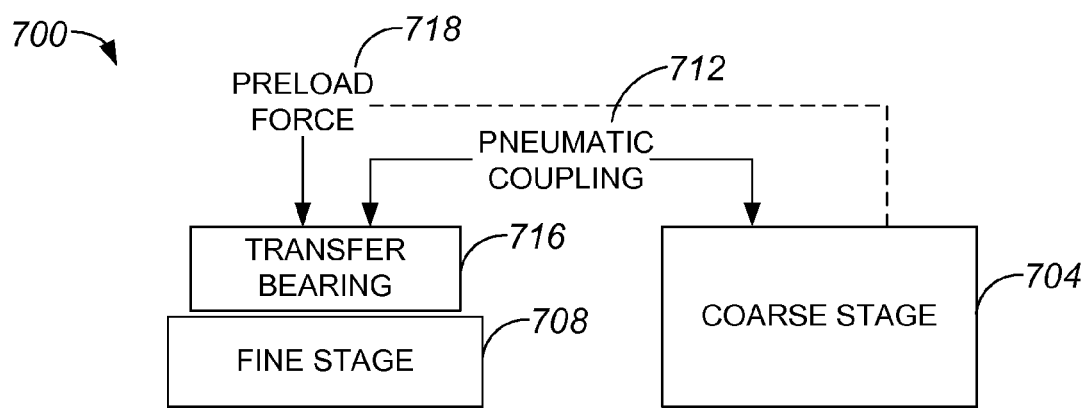
FIG. 7 is a diagrammatic block diagram representation of a stage apparatus which shows couplings between a coarse stage and a transfer bearing, in accordance with an embodiment of the present invention.

FIG. 7 is a diagrammatic block diagram representation of a stage apparatus which shows couplings between a coarse stage and a transfer bearing, in accordance with an embodiment of the present invention. A stage apparatus 700 includes a coarse stage 704 which is pneumatically coupled to a transfer bearing 716 through a pneumatic coupling 712. Pneumatic coupling 712 is typically a direct coupling between coarse stage 704 and transfer bearing 716 that enables air at a positive pressure or air at a negative pressure to be passed from coarse stage 704 through transfer bearing 716 to fine stage 708, as discussed above.

A preload force 718, in one embodiment, may be applied using pressurized air acting on a bearing surface attached or coupled to fine stage 708 that is substantially opposite to the bottom surface of transfer bearing 716. As a result, preload force 718 is coupled to fine stage 708, although it should be appreciated that preload force 718 may instead be coupled to another component.

Figure 9:
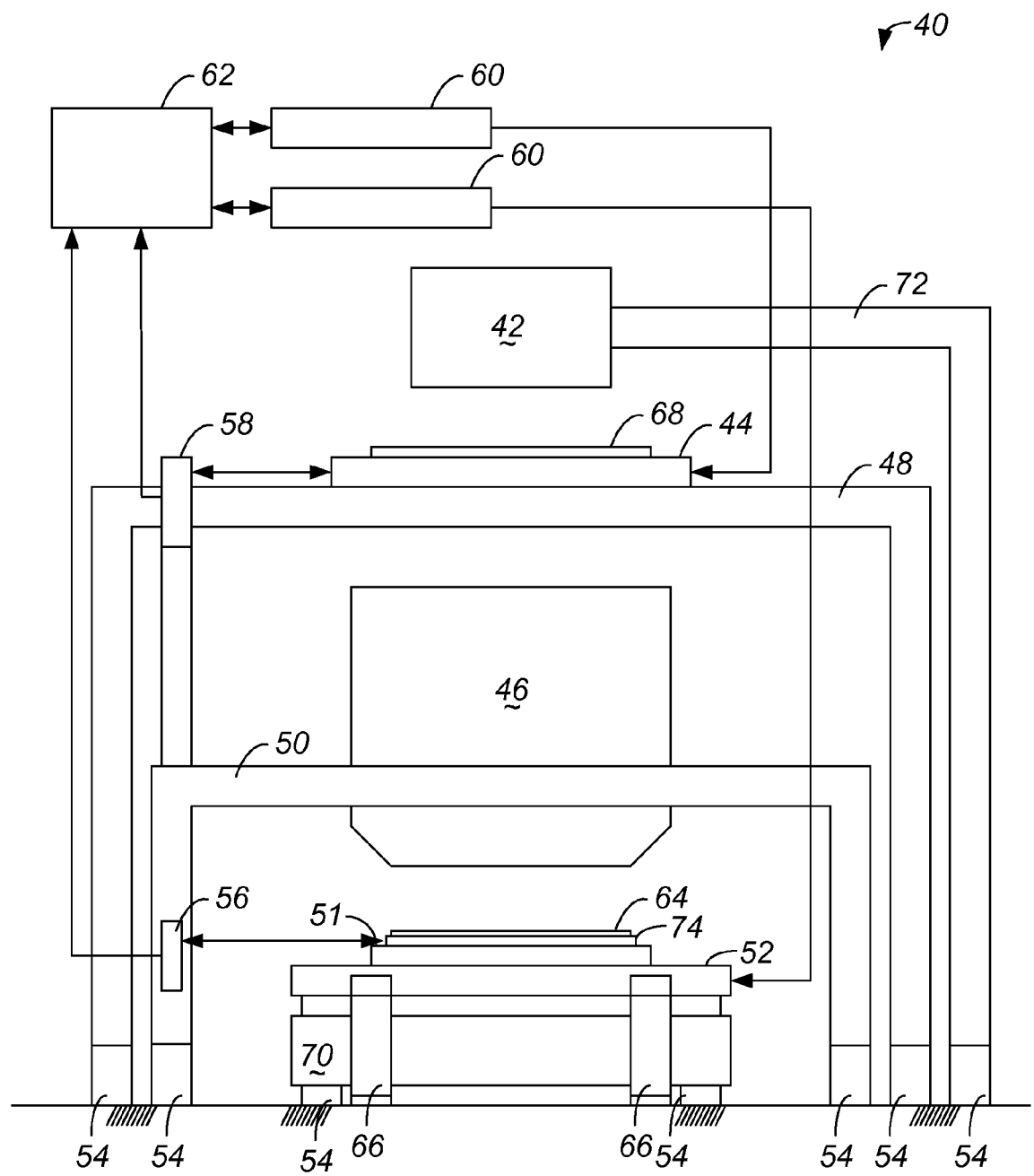
FIG. 9 is a diagrammatic representation of a photolithography apparatus in accordance with an embodiment of the present invention.

With reference to FIG. 9, a photolithography apparatus which may include a transfer bearing and, hence, a pneumatic transfer mechanism which is used to transfer air and vacuum indirectly between a coarse stage and a fine stage will be described in accordance with an embodiment of the present invention. A photolithography apparatus (exposure apparatus) 40 includes a wafer positioning stage 52 that may be driven by a planar motor (not shown), as well as a wafer table 51 that is magnetically coupled to wafer positioning stage 52 by utilizing an EI-core actuator, e.g., an EI-core actuator with a top coil and a bottom coil which are substantially independently controlled. The planar motor which drives wafer positioning stage 52 generally uses an electromagnetic force generated by magnets and corresponding armature coils arranged in two dimensions. A wafer 64 is held in place on a wafer holder or chuck 74 which is coupled to wafer table 51. Wafer positioning stage 52 is arranged to move in multiple degrees of freedom, e.g., between three to six degrees of freedom, under the control of a control unit 60 and a system controller 62. In one embodiment, wafer positioning stage 52 may include a plurality of actuators which are coupled to a common magnet track. The movement of wafer positioning stage 52 allows wafer 64 to be positioned at a desired position and orientation relative to a projection optical system 46.

Wafer table 51 may be levitated in a z-direction 10*b* by any number of voice coil motors (not shown), e.g., three voice coil motors. In the described embodiment, at least three magnetic bearings (not shown) couple and move wafer table 51 along a y-axis 10*a*. The motor array of wafer positioning stage 52 is typically supported by a base 70. Base 70 is supported to a ground via isolators 54. Reaction forces generated by motion of wafer stage 52 may be mechanically released to a ground surface through a frame 66. One suitable frame 66 is described in JP Hei 8-166475 and U.S. Pat. No. 5,528,118, which are each herein incorporated by reference in their entireties.

An illumination system 42 is supported by a frame 72. Frame 72 is supported to the ground via isolators 54. Illumination system 42 includes an illumination source, and is arranged to project a radiant energy, e.g., light, through a mask pattern on a reticle 68 that is supported by and scanned using a reticle stage which includes a coarse stage and a fine stage. The radiant energy is focused through projection optical system 46, which is supported on a projection optics frame 50 and may be supported the ground through isolators 54. Suitable isolators 54 include those described in JP Hei 8-330224 and U.S. Pat. No. 5,874,820, which are each incorporated herein by reference in their entireties.

A first interferometer 56 is supported on projection optics frame 50, and functions to detect the position of wafer table 51. Interferometer 56 outputs information on the position of wafer table 51 to system controller 62. In one embodiment, wafer table 51 has a force damper which reduces vibrations associated with wafer table 51 such that interferometer 56 may accurately detect the position of wafer table 51. A second interferometer 58 is supported on projection optical system 46, and detects the position of reticle stage 44 supported by a frame 48 which supports a reticle 68. Interferometer 58 also outputs position information to system controller 62.

It should be appreciated that there are a number of different types of photolithographic apparatuses or devices. For example, photolithography apparatus 40, or an exposure apparatus, may be used as a scanning type photolithography system which exposes the pattern from reticle 68 onto wafer 64 with reticle 68 and wafer 64 moving substantially synchronously. In a scanning type lithographic device, reticle 68 is moved perpendicularly with respect to an optical axis of a lens assembly (projection optical system 46) or illumination system 42 by reticle stage 44. Wafer 64 is moved perpendicularly to the optical axis of projection optical system 46 by a wafer stage 52. Scanning of reticle 68 and wafer 64 generally occurs while reticle 68 and wafer 64 are moving substantially synchronously.

Alternatively, photolithography apparatus or exposure apparatus 40 may be a step-and-repeat type photolithography system that exposes reticle 68 while reticle 68 and wafer 64 are stationary, i.e., at a substantially constant velocity of approximately zero meters per second. In one step and repeat process, wafer 64 is in a substantially constant position relative to reticle 68 and projection optical system 46 during the exposure of an individual field. Subsequently, between consecutive exposure steps, wafer 64 is consecutively moved by wafer positioning stage 52 perpendicularly to the optical axis of projection optical system 46 and reticle 68 for exposure. Following this process, the images on reticle 68 may be sequentially exposed onto the fields of wafer 64 so that the next field of semiconductor wafer 64 is brought into position relative to illumination system 42, reticle 68, and projection optical system 46.

It should be understood that the use of photolithography apparatus or exposure apparatus 40, as described above, is not limited to being used in a photolithography system for semiconductor manufacturing. For example, photolithography apparatus 40 may be used as a part of a liquid crystal display (LCD) photolithography system that exposes an LCD device pattern onto a rectangular glass plate or a photolithography system for manufacturing a thin film magnetic head.

The illumination source of illumination system 42 may be g-line (436 nanometers (nm)), i-line (365 nm), a KrF excimer laser (248 nm), an ArF excimer laser (193 nm), and an $F_2$-type laser (157 nm). Alternatively, illumination system 42 may also use charged particle beams such as x-ray and electron beams. For instance, in the case where an electron beam is used, thermionic emission type lanthanum hexaboride ($LaB_6$) or tantalum (Ta) may be used as an electron gun. Furthermore, in the case where an electron beam is used, the structure may be such that either a mask is used or a pattern may be directly formed on a substrate without the use of a mask.

With respect to projection optical system 46, when far ultra-violet rays such as an excimer laser is used, glass materials such as quartz and fluorite that transmit far ultraviolet rays is preferably used. When either an $F_2$-type laser or an x-ray is used, projection optical system 46 may be either catadioptric or refractive (a reticle may be of a corresponding reflective type), and when an electron beam is used, electron optics may comprise electron lenses and deflectors. As will be appreciated by those skilled in the art, the optical path for the electron beams is generally in a vacuum.

In addition, with an exposure device that employs vacuum ultra-violet (VUV) radiation of a wavelength that is approximately 200 nm or lower, use of a catadioptric type optical system may be considered. Examples of a catadioptric type of optical system include, but are not limited to, those described in Japan Patent Application Disclosure No. 8-171054 published in the Official gazette for Laid-Open Patent Applications and its counterpart U.S. Pat. No. 5,668, 672, as well as in Japan Patent Application Disclosure No. 10-20195 and its counterpart U.S. Pat. No. 5,835,275, which are all incorporated herein by reference in their entireties. In these examples, the reflecting optical device may be a catadioptric optical system incorporating a beam splitter and a concave mirror. Japan Patent Application Disclosure (Hei) No. 8-334695 published in the Official gazette for Laid-Open Patent Applications and its counterpart U.S. Pat. No. 5,689,377, as well as Japan Patent Application Disclosure No. 10-3039 and its counterpart U.S. Pat. No. 5,892,117, which are all incorporated herein by reference in their entireties. These examples describe a reflecting-refracting type of optical system that incorporates a concave mirror, but without a beam splitter, and may also be suitable for use with the present invention.

Further, in photolithography systems, when linear motors (see U.S. Pat. Nos. 5,623,853 or 5,528,118, which are each incorporated herein by reference in their entireties) are used in a wafer stage or a reticle stage, the linear motors may be either an air levitation type that employs air bearings or a magnetic levitation type that uses Lorentz forces or reactance forces. Additionally, the stage may also move along a guide, or may be a guideless type stage which uses no guide.

Alternatively, a wafer stage or a reticle stage may be driven by a planar motor which drives a stage through the use of electromagnetic forces generated by a magnet unit that has magnets arranged in two dimensions and an armature coil unit that has coil in facing positions in two dimensions. With this type of drive system, one of the magnet unit or the armature coil unit is connected to the stage, while the other is mounted on the moving plane side of the stage.

Movement of the stages as described above generates reaction forces which may affect performance of an overall photolithography system. Reaction forces generated by the wafer (substrate) stage motion may be mechanically released to the floor or ground by use of a frame member as described above, as well as in U.S. Pat. No. 5,528,118 and published Japanese Patent Application Disclosure No. 8-166475. Additionally, reaction forces generated by the reticle (mask) stage motion may be mechanically released to the floor (ground) by use of a frame member as described in U.S. Pat. No. 5,874,820 and published Japanese Patent Application Disclosure No. 8-330224, which are each incorporated herein by reference in their entireties.

Isolaters such as isolators 54 may generally be associated with an active vibration isolation system (AVIS). An AVIS generally controls vibrations associated with forces 112, i.e., vibrational forces, which are experienced by a stage assembly or, more generally, by a photolithography machine such as photolithography apparatus 40 which includes a stage assembly.

A photolithography system according to the above-described embodiments, e.g., a photolithography apparatus which may include one or more dual force actuators, may be built by assembling various subsystems in such a manner that prescribed mechanical accuracy, electrical accuracy, and optical accuracy are maintained. In order to maintain the various accuracies, prior to and following assembly, substantially every optical system may be adjusted to achieve its optical accuracy. Similarly, substantially every mechanical system and substantially every electrical system may be adjusted to achieve their respective desired mechanical and electrical accuracies. The process of assembling each subsystem into a photolithography system includes, but is not limited to, developing mechanical interfaces, electrical circuit wiring connections, and air pressure plumbing connections between each subsystem. There is also a process where each subsystem is assembled prior to assembling a photolithography system from the various subsystems. Once a photolithography system is assembled using the various subsystems, an overall adjustment is generally performed to ensure that substantially every desired accuracy is maintained within the overall photolithography system. Additionally, it may be desirable to manufacture an exposure system in a clean room where the temperature and humidity are controlled.

Figure 10:
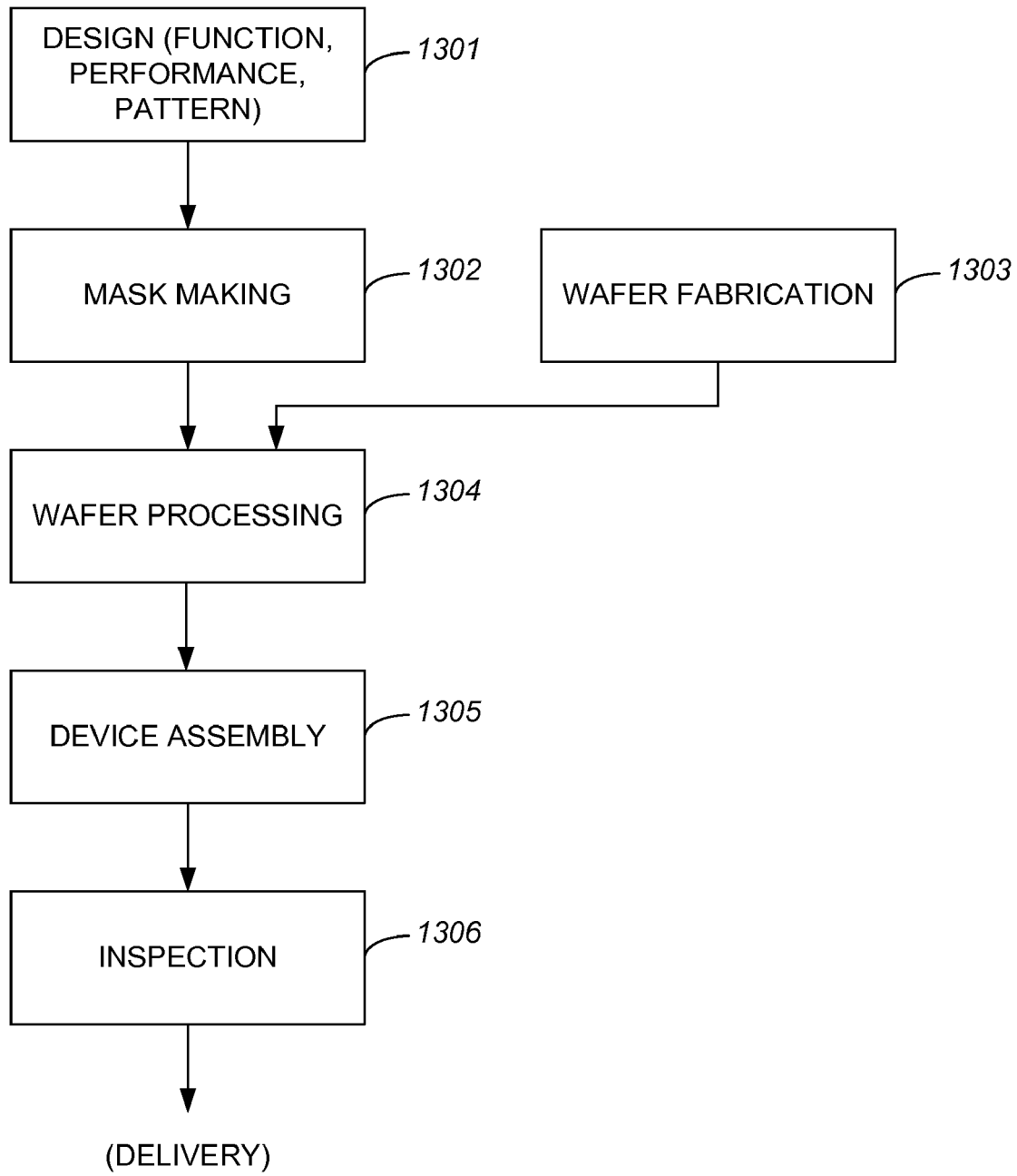
FIG. 10 is a process flow diagram which illustrates the steps associated with fabricating a semiconductor device in accordance with an embodiment of the present invention.

Further, semiconductor devices may be fabricated using systems described above, as will be discussed with reference to FIG. 10. The process begins at step 1301 in which the function and performance characteristics of a semiconductor device are designed or otherwise determined. Next, in step 1302, a reticle (mask) in which has a pattern is designed based upon the design of the semiconductor device. It should be appreciated that in a parallel step 1303, a wafer is made from a silicon material. The mask pattern designed in step 1302 is exposed onto the wafer fabricated in step 1303 in step 1304 by a photolithography system. One process of exposing a mask pattern onto a wafer will be described below with respect to FIG. 11. In step 1305, the semiconductor device is assembled. The assembly of the semiconductor device generally includes, but is not limited to, wafer dicing processes, bonding processes, and packaging processes. Finally, the completed device is inspected in step 1306.

Figure 11:
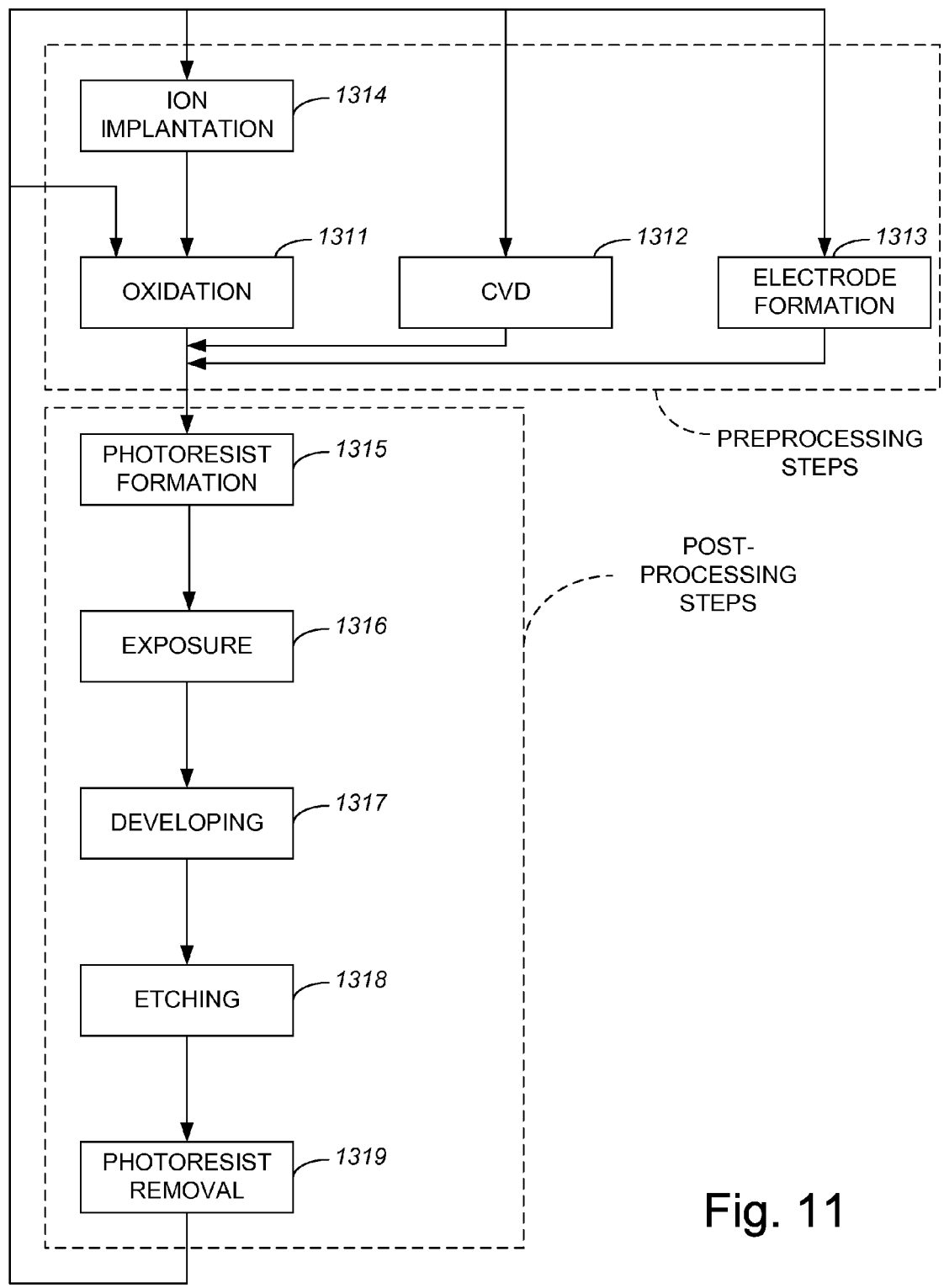
FIG. 11 is a process flow diagram which illustrates the steps associated with processing a wafer, i.e., step 1304 of FIG. 10, in accordance with an embodiment of the present invention.

FIG. 11 is a process flow diagram which illustrates the steps associated with wafer processing in the case of fabricating semiconductor devices in accordance with an embodiment of the present invention. In step 1311, the surface of a wafer is oxidized. Then, in step 1312 which is a chemical vapor deposition (CVD) step, an insulation film may be formed on the wafer surface. Once the insulation film is formed, in step 1313, electrodes are formed on the wafer by vapor deposition. Then, ions may be implanted in the wafer using substantially any suitable method in step 1314. As will be appreciated by those skilled in the art, steps 1311-1314 are generally considered to be preprocessing steps for wafers during wafer processing. Further, it should be understood that selections made in each step, e.g., the concentration of various chemicals to use in forming an insulation film in step 1312, may be made based upon processing requirements.

At each stage of wafer processing, when preprocessing steps have been completed, post-processing steps may be implemented. During post-processing, initially, in step 1315, photoresist is applied to a wafer. Then, in step 1316, an exposure device may be used to transfer the circuit pattern of a reticle to a wafer. Transferring the circuit pattern of the reticle of the wafer generally includes scanning a reticle scanning stage which may, in one embodiment, include a force damper to dampen vibrations.

After the circuit pattern on a reticle is transferred to a wafer, the exposed wafer is developed in step 1317. Once the exposed wafer is developed, parts other than residual photoresist, e.g., the exposed material surface, may be removed by etching in step 1318. Finally, in step 1319, any unnecessary photoresist that remains after etching may be removed. As will be appreciated by those skilled in the art, multiple circuit patterns may be formed through the repetition of the preprocessing and post-processing steps.

Although only a few embodiments of the present invention have been described, it should be understood that the present invention may be embodied in many other specific forms without departing from the spirit or the scope of the present invention. By way of example, while a transfer bearing has been shown as being substantially rectangular in shape, the shape of transfer bearing may be any suitable shape. Further, the size of transfer bearing may also vary. For instance, a transfer bearing may have a dimension along a z-axis that is significantly smaller than a dimension of a fine stage along the z-axis to minimize the weight of the transfer bearing.

The relative sizes of openings, e.g., air flow openings or vacuum openings, in a transfer bearing and openings in a fine stage may vary. As described above, the diameters of openings in a transfer bearing, which are arranged to interface with corresponding openings in a fine stage, is typically less than or approximately equal to the diameters of the corresponding openings in the fine stage. However, the diameters of the openings in the transfer bearing may also be greater than the diameters of the openings in the fine stage.

While the size, e.g., diameter, of openings in a transfer bearing that are arranged to be interfaced with openings in a fine stage have generally been described as being approximately the same, it should be appreciated that each opening may have a different diameters. That is, different openings in a transfer bearing may have different diameters. By way of example, openings which accommodate a positive air pressure may be larger than openings which accommodate a negative air pressure, or vice versa. Similarly, the diameter of each opening in a fine stage may also be different from the diameters of the other openings in the fine stage.

A transfer bearing has generally been described as being used to substantially eliminate disturbance forces on a fine stage during acceleration and deceleration of the fine stage which typically arise when tubes directly transfer air and vacuum between a coarse stage and the fine stage. A transfer bearing, however, may be arranged to be used in substantially any stage system which requires the transfer of air or vacuum. In other words, the use of a transfer bearing is not limited to a system which includes a coarse stage and a fine stage.

A pneumatic transfer system has been described as including a transfer bearing and at least one tube or hose. A tube or a hose is typically used to transfer air or a vacuum from a coarse stage to the transfer bearing. It should be appreciated, however, that a mechanism used to provide air or a vacuum to a transfer bearing from a coarse stage may vary. In other words, mechanisms other than tubes or hoses may be used to provide pneumatic transfer between a coarse stage and a transfer bearing.

One embodiment of a preload mechanism for a transfer bearing was described above with respect to FIG. 2. It should be appreciated that the configuration of a preload mechanism may generally vary widely, and may either be coupled to a fine stage or to a coarse stage. Therefore, the present examples are to be considered as illustrative and not restrictive, and the invention is not to be limited to the details given herein, but may be modified within the scope of the appended claims.

What is claimed is:

1. A stage apparatus comprising:
   a first stage;
   a second stage; and
   a pneumatic transfer system, the pneumatic transfer system including at least one transfer mechanism and a transfer block, the at least one transfer mechanism being arranged to be coupled between the first stage and the transfer block, the first stage being arranged to provide a flow through the at least one transfer mechanism to the transfer block, wherein the transfer block is arranged to be positioned substantially over a surface of the second stage to provide the flow to the second stage substantially without contacting the second stage.

2. The stage apparatus of claim 1 wherein the transfer block includes a first block opening defined therethrough and a second block opening defined therethrough, and the at least one transfer mechanism includes a first transfer mechanism and a second transfer mechanism, the first transfer mechanism being in fluid communication with the first block opening and the second transfer mechanism being in fluid communication with the second block opening.

3. The stage apparatus of claim 2 wherein the first transfer mechanism provides a first air flow through the first block opening to substantially enable the transfer block to maintain a distance from the second stage.

4. The stage apparatus of claim 3 farther including:
   a preload mechanism, the preload mechanism being arranged to provide a preload force on the transfer block, wherein the preload force and the first air flow cooperate to substantially enable the transfer block to maintain the distance from the second stage.

5. The stage apparatus of claim 2 wherein the second transfer mechanism provides the flow through the second block opening to a first stage opening defined within the second stage, wherein the flow causes the second stage to translate.

6. The stage apparatus of claim 5 wherein the flow is one of an air flow with a positive pressure and an air flow with a negative pressure.

7. The stage apparatus of claim 1 wherein the first stage is a coarse stage and the second stage is a fine stage, the fine stage being arranged to support an object to be scanned.

8. A stage device comprising:
   a coarse stage;
   a fine stage; and
   a pneumatic transfer system, the pneumatic transfer system being in contact with the coarse stage such that the pneumatic transfer system is substantially directly coupled to the coarse stage, wherein the pneumatic transfer system is arranged to provide a pneumatic flow from the coarse stage to the fine stage substantially without being in direct contact with the fine stage, the pneumatic flow being arranged to enable the fine stage to translate.

9. The stage device of claim 8 wherein the pneumatic flow is arranged to flow between the pneumatic transfer system and the fine stage through a gap defined between the pneumatic transfer system and the fine stage.

10. The stage device of claim 8 wherein the pneumatic transfer system includes a transfer bearing and a plurality of flow hoses, the transfer bearing having a plurality of transfer bearing openings defined therein, wherein each of the plurality of flow hoses is in fluid communication with a corresponding transfer bearing opening and with the coarse stage.

11. The stage device of claim 10 wherein the fine stage has an air bearing arrangement and at least one fine stage opening defined therein, wherein the at least one fine stage opening is arranged to be in fluid communication with a first transfer bearing opening of the plurality of transfer bearing openings such that the pneumatic flow is provided to the air bearing arrangement.

12. The stage device of claim 10 wherein a first flow hose of the plurality of flow hoses is arranged to provide a first transfer bearing opening of the plurality of transfer bearing openings with pressurized air, the stage device further including:
   a preload arrangement, the preload arrangement being arranged to provide a preload force on the transfer bearing which cooperates with the pressurized air to substantially maintain the transfer bearing at a distance above the fine stage.

13. A method for positioning a first stage, the first stage being in fluid communication with a second stage through a pneumatic transfer system, the pneumatic transfer system including a plurality of hoses and a transfer block, the plurality of hoses being coupled to the second stage, the method comprising:

providing a first flow to the transfer block through a first hose of the plurality of hoses, the first flow being arranged to enable the transfer block to be positioned at a distance above a surface of the first stage; and providing a second flow to the first stage through a second hose of the plurality of hoses and the transfer block, the second flow being arranged to allow the first stage to move.

14. The method for positioning the first stage of claim 13 wherein providing the first flow to the transfer block through the first host include providing a positive air pressure to the transfer block.

15. The method for positioning the first stage of claim 13 further including:

providing a third flow to the first stage through a third hose of the plurality of hoses and the transfer block, the third flow being arranged to cooperate with the second flow to allow the first stage to move.

16. The method for positioning the first stage of claim 15 wherein providing the second flow includes providing a positive air pressure and providing the third flow includes providing a negative air pressure.

17. The method for positioning the first stage of claim 13 wherein allowing the first stage to move include allowing the first stage to move in a lateral direction.

18. The method for positioning the first stage of claim 13 wherein the transfer block is preloaded.

* * * * *